Feb. 11, 1947. F. MARVIN 2,415,648
FRUIT PICKER
Filed March 26, 1945 2 Sheets-Sheet 2
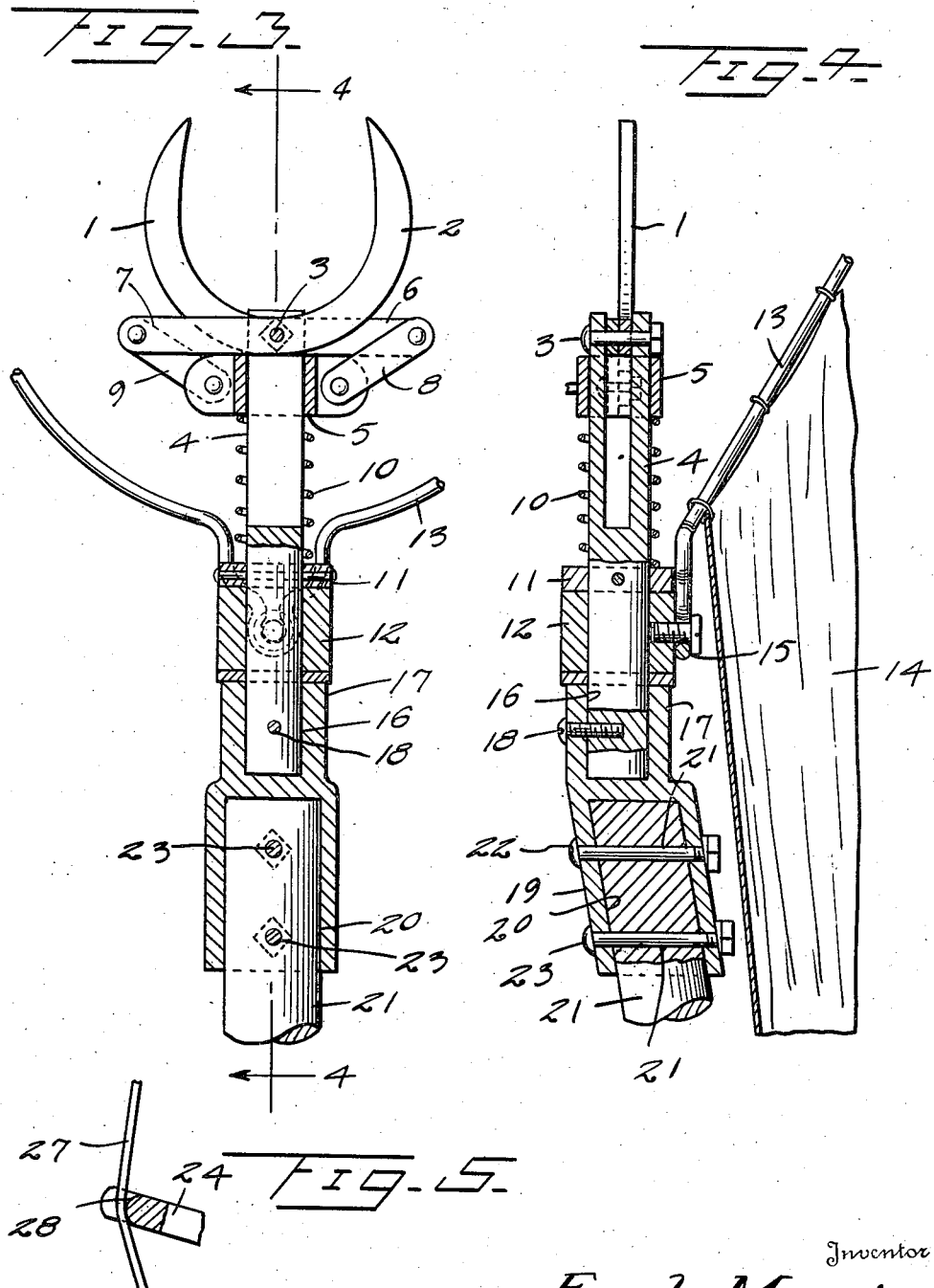
Inventor
Fred Marvin Patented Feb. 11, 1947

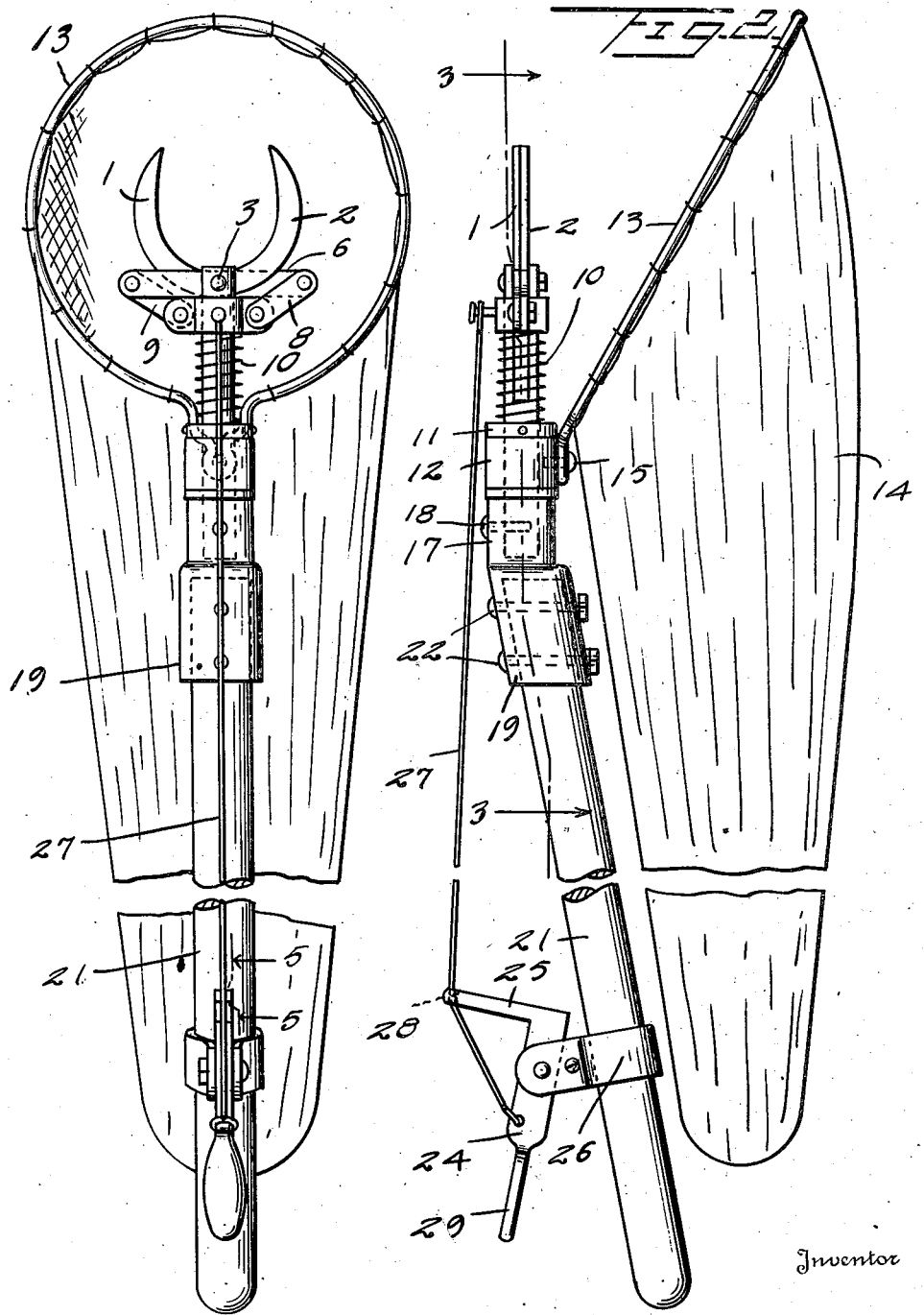

2,415,648

UNITED STATES PATENT OFFICE 2,415,648

FRUIT PICKER

Fred Marvin, Barberton, Ohio

Application March 26, 1945, Serial No. 584,747

1 Claim. (Cl. 56—335)

This invention relates to new and useful improvements in fruit pickers.

The primary object of my invention is to provide a device of this character that will greatly facilitate the picking of tree fruit, such as apples, pears, peaches, oranges and the like, that are difficult to reach from a ladder or the ground.

A further object of my invention is to provide a fruit picker of the kind mentioned that is simple and economical in construction and highly efficient and durable in use.

With the foregoing and other objects in view that will appear as the nature of my invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1 is a front elevation of a fruit picker constructed in accordance with my invention.

Figure 2 is a side elevation.

Figure 3 is a vertical transverse section, taken on line 3—3 of Figure 2, looking in the direction indicated by the arrows and with the parts represented on an enlarged scale.

Figure 4 is a vertical transverse section, taken on line 4—4 of Figure 3.

Figure 5 is an enlarged detail fragmentary sectional view of the hand lever and wire cable connecting the hand lever to the sliding collar.

Referring to the drawings for a more particular description of my invention, and in which drawings like parts are designated by like reference characters throughout the several views, the numerals 1 and 2 represent a pair of oppositely disposed approximately semicircular shear blades, pivoted near their lower ends by means of the transverse bolt 3, or other equivalent means, to the slotted upper end of the cylindrical shaft 4.

A sliding collar 5 is mounted for reciprocating movement on the upper end of the shaft 4, and the straight outwardly extending lower ends 6 and 7 of the shear blades 1 and 2, respectively, are connected at diametrically opposite points to said sliding collar, by means of the angularly or inwardly inclined links 8 and 9.

A coil expansion spring 10 is disposed around the cylindrical shaft 4, between the base of the collar 5 and the stationary ring 11, the purpose of which will presently appear.

In carrying out my invention, a collar 12 is swiveled or loosely mounted on the shaft 4 directly beneath the stationary ring 11, and carries the wire loop 13 which supports the cloth bag or tube 14. The lower end of the loop 13 is removably secured to the collar 12 by the screw 15 or other equivalent means. By means of this arrangement, the cloth bag or tube may be freely swung to any position desired in picking the fruit.

The lower end of the shaft 4 fits in a corresponding bore 16 in the upper end of the casting 17, and is removably fastened in place by the screw 18. The lower end 19 of the casting 17 is formed at a slight outward angle or inclination with respect to the shaft 4 and is provided with an opening 20 to receive the upper end of the handle 21. The handle 21 is fastened to the casting 17 by the bolts and nuts 22 and 23, or other equivalent means, and said handle may be of any desired length.

A hand lever 24, formed at its inner or upper end with a right-angularly disposed arm 25, is pivoted by means of the clamping bracket 26 to the lower end of the handle 21, and is connected by means of the wire 27, to the sliding collar 5. As shown, the wire 27 passes through a transverse slot or opening 28 in the outer end of the arm 25.

In working from the ground with a long handle, a cloth bag or tube 14 reaching the full length of the handle and allowing the fruit to slide gently down to the bottom of the bag, may be used. In working from a ladder, a relatively short handle may be employed, in which case a correspondingly short bag or tube may be used to collect the fruit.

In practice, the upper end or mouth of the bag or tube is placed under the fruit to be gathered, with the stem of the fruit in the opening between the upper ends of the shear blades 1 and 2. The handle 29 of the hand lever 24 is then depressed by the operator, causing the shear blades to close and shear off the stem of the fruit, which falls into the bag or tube, as the case may be. The coil expansion spring 10 returns the shear blades 1 and 2 to open position when pressure on the handle of the hand lever is released by the operator.

From the foregoing description taken in connection with the drawings, it is thought that the construction, operation and advantages of my invention will be readily understood, without requiring a more extended explanation.

Various changes in the form, proportions and minor details of construction may be resorted to without departing from the principles or sacrificing any of the advantages of my invention, as defined in the appended claim.

Having described my invention, what I claim as new and desire to secure by Letters Patent is:

In a fruit picker of the character specified, a pair of oppositely disposed shear blades formed with approximately semicircular upper ends and straight outwardly extending lower ends, a slotted shaft to which the shear blades are pivotally connected, a handle for said shaft, a collar slidably mounted on the upper end of said shaft below said shear blades, inwardly inclined links for connecting the straight outwardly extending lower ends of the shear blades to said collar, a coil expansion spring disposed around the upper end of said shaft with its upper end bearing against said collar, for normally holding the shear blades in open position, manually operated means for closing said shear blades against the tension of said expansion spring, said means including a hand lever pivoted to the handle and a flexible connection between the hand lever and sliding collar, a second collar loosely mounted on the lower end of said shaft, and a bag or sack supported on said collar.

FRED MARVIN.

REFERENCES CITED

The following references are of record in the file of this patent:

UNITED STATES PATENTS

| Number | Name | Date |
|---|---|---|
| 256,421 | Williamson et al. | Apr. 11, 1882 |
| 862,227 | Woodring | Aug. 6, 1907 |
| 1,860,594 | Pettit | May 31, 1932 |

FOREIGN PATENTS

| Number | Country | Date |
|---|---|---|
| 368,804 | British | Mar. 2, 1932 |